United States Patent
Yamagishi

(10) Patent No.: US 8,275,246 B2
(45) Date of Patent: Sep. 25, 2012

(54) DIGITAL CONTENT REPRODUCING AND STORING APPARATUS, DIGITAL CONTENT REPRODUCING AND STORING METHOD, DIGITAL CONTENT STORING APPARATUS, DIGITAL CONTENT REPRODUCING APPARATUS, AND COMPUTER READABLE MEDIUM STORING DIGITAL CONTENT REPRODUCING AND STORING PROGRAM

(75) Inventor: Yoshikazu Yamagishi, Aichi (JP)

(73) Assignee: Buffalo Inc., Aichi (JP)

( * ) Notice: Subject to any disclaimer, the term of this patent is extended or adjusted under 35 U.S.C. 154(b) by 1234 days.

(21) Appl. No.: 12/034,292

(22) Filed: Feb. 20, 2008

(65) Prior Publication Data

US 2008/0199157 A1 Aug. 21, 2008

(30) Foreign Application Priority Data

Feb. 20, 2007 (JP) ................ P2007-039737

(51) Int. Cl.
*H04N 5/76* (2006.01)
(52) U.S. Cl. ........................ 386/326
(58) Field of Classification Search .......... 386/124
See application file for complete search history.

(56) References Cited

U.S. PATENT DOCUMENTS

| 7,027,712 | B2 * | 4/2006 | Klausberger et al. | 386/241 |
| 2002/0051467 | A1 * | 5/2002 | Kawakatsu | 370/474 |
| 2007/0133607 | A1 * | 6/2007 | Park | 370/484 |

FOREIGN PATENT DOCUMENTS

| EP | 1148727 A1 | 10/2001 |
| JP | 7-327199 A | 12/1995 |
| JP | 2001-167528 A | 6/2001 |
| JP | 2004-254332 A | 9/2004 |
| WO | 01/35669 A1 | 5/2001 |

OTHER PUBLICATIONS

Notification of Reason for Refusal dated Feb. 4, 2009, issued in corresponding Japanese Patent Application No. 2007-039737.
European Search Report dated Oct. 16, 2009, issued in corresponding European Patent Application No. 08250590.0.

* cited by examiner

*Primary Examiner* — Farid Homayounmehr
*Assistant Examiner* — Lisa Lewis
(74) *Attorney, Agent, or Firm* — Westerman, Hattori, Daniels & Adrian, LLP

(57) ABSTRACT

A digital content reproducing and storing apparatus according to one aspect of the invention is configured to perform a storing operation while receiving TS packet constituting digital content and configured to perform a reproducing operation through a PES (Packetized Elementary Stream) obtained by demultiplexing the received TS packet or a read-out TS packet stored therein. The digital content reproducing and storing apparatus includes: a storing unit operable to: demultiplex the received TS packet to obtain the PES; add time information contained in the obtained PES to the received TS packet; and store the received TS packet with the time information added thereto; and a reproducing unit configured to specify a TS packet based on the time information corresponding to a designated prior time and perform the reproducing operation based on the specified TS packet.

7 Claims, 8 Drawing Sheets

US 8,275,246 B2

DIGITAL CONTENT REPRODUCING AND STORING APPARATUS, DIGITAL CONTENT REPRODUCING AND STORING METHOD, DIGITAL CONTENT STORING APPARATUS, DIGITAL CONTENT REPRODUCING APPARATUS, AND COMPUTER READABLE MEDIUM STORING DIGITAL CONTENT REPRODUCING AND STORING PROGRAM

CROSS-REFERENCE TO RELATED APPLICATIONS

This application is based upon and claims priority from Japanese Patent Application No. 2007-039737, filed on Feb. 20, 2007, the entire contents of which are incorporated herein by reference.

BACKGROUND

1. Field of the Invention

The present invention relates to a digital content reproducing and storing apparatus, a digital content reproducing and storing method, a digital content storing apparatus, a digital content reproducing apparatus, and a computer readable medium storing digital content reproducing and storing program.

2. Description of the Related Art

Recently, a digital broadcast has been distributed through various communication media. The transmission of digital content through communication may involve loss of data or transmission error of data. For this reason, the data is transmitted with a packet multiplexing, for example, a TS (Transport Stream) packet multiplexing.

That is, a transmitter multiplexes and packetizes digital data containing images, audios and other information and transmits the digital data to a receiver. The receiver restores loss or the transmission error of the received digital data and then decodes the digital data to reproduce the original images, audios, and other information. In many cases, for user's convenience, the received data are often stored to be reproduced in later.

For example, JP-A-7-327199 discloses a transmission of TS packets constituting such digital content.

SUMMARY

At the time of reproducing the received data, a user may desire to watch the prior scene, e.g., the scene starting from 10 second before, again. At this time, if the received TS packets are stored, the stored data can be watched again. The procedure for reproducing the prior scene is substantially as follows.

The received TS packet data are reproduced while being sequentially stored in a hard disk etc. The reproducing operation is performed on the basis of a PES (Packetized Elementary Stream) that is obtained by the following processes of: collecting the TS packets, correcting the loss or error thereof, and demultiplexing the corrected TS packets. When a user desires to watch a prior scene in real time, the user selects and reads the prior TS packets corresponding to a desired reproduction time which is obtained by guess. When a series of TS packets are read as much as possible, the TS packets are demultiplexed to restore the PES and obtain actual time included in the PES. If the read TS packets include the scene on the desired time, the read TS packets are reproduced. However, since the TS packets are just selected by guess, the TS packets may not have the desired scene. In this case, the subsequent TS packets are read based on time obtained from the PES, and this process is repeated until the PES containing the scene on the desired time is obtained.

As a result, since such trial and error has to be processed, processing time may naturally be necessitated, and processing load may be large. Although a PS (Program Stream) having been obtained during a reproducing operation may be stored, since the PS can store video and audio but cannot store other data, the stored PS can not be used.

In JP-A-7-327199, it is possible to easily search a desired program data among a plurality of programs by rewriting a PID (Packet ID). However, it is not possible to access data of the desired reproduction time.

One aspect of the present invention is contrived in consideration of the above-described circumstances, has an object to provide a digital content reproducing and storing apparatus, a digital content reproducing and storing method, a digital content storing apparatus, a digital content reproducing apparatus, and a computer readable medium storing digital content reproducing and storing program, which are capable of accessing data of the desired reproduction time.

According to a first aspect of the invention, there is provided a digital content reproducing and storing apparatus configured to perform a storing operation while receiving TS packet constituting digital content and configured to perform a reproducing operation through a PES (Packetized Elementary Stream) obtained by demultiplexing the received TS packet or a read-out TS packet stored therein, the digital content reproducing and storing apparatus comprising: a storing unit operable to: demultiplex the received TS packet to obtain the PES; add time information contained in the obtained PES to the received TS packet; and store the received TS packet with the time information added thereto; and a reproducing unit configured to specify a TS packet based on the time information corresponding to a designated prior time and perform the reproducing operation based on the specified TS packet.

According to a second aspect of the invention, there is provided a digital content reproducing and storing method for performing a storing operation while receiving TS (Transport Stream) packets constituting digital content and performing a reproducing operation through a PES (Packetized Elementary Stream) obtained by demultiplexing the received TS packet or read-out TS packet having been stored therein, the digital content reproducing and storing method comprising: demultiplexing the received TS packet to obtain the PES and adding time information contained in the obtained PES to the received TS packet, to store the received TS packet with the time information added thereto; and specifying a TS packet based on the time information corresponding to a designated prior time to perform the reproducing operation based on the specified TS packet.

According to a third aspect of the invention, there is provided a computer readable medium that stores a digital content reproducing and storing program for enabling a computer to execute a function of performing a storing operation while receiving TS (Transport Stream) packet constituting digital content and to execute a function of performing a reproducing operation through a PES (Packetized Elementary Stream) obtained by demultiplexing the received TS packet or the read-out TS packets having been stored therein, the program enables the computer to execute: a storing function of demultiplexing the received TS packet to obtain the PES, adding time information contained in the obtained PES to the received TS packet, and storing the received TS packet with the time information added thereto; and a reproducing function of specifying a TS packet based on the time information corresponding to a designated prior time and performing the reproducing operation based on the specified TS packet.

According to a fourth aspect of the invention, there is provided a digital content storing apparatus storable a received TS (Transport Stream) packet constituting digital content, the digital content storing apparatus comprising: a storing unit configured to store the received TS packet with time information added thereto, the time information contained in a PES obtained by demultiplexing the received TS packet.

According to a fifth aspect of the invention, there is provided a digital content reproducing apparatus comprising: a digital data receiving unit configured to receive the TS (Transport Stream) packet constituting digital contents; a demultiplexing unit configured demultiplex the TS packet to extract at least an image PES (Packetized Elementary Stream) and an audio PES; an image and audio signal decoding unit configured to perform decoding operations based on the image PES and the audio PES to obtain an image signal and an audio signal, respectively, and to output the image signal and the audio signal synchronized with one another; a TS packet buffering unit configured to buffer the received TS packet; a TS packet storing unit configured to extract time information based on the PES and to store the buffered TS packet with the extracted time information; and a TS packet reading unit configured to obtain designated prior time information and to read the stored TS packet corresponding to the designated time information to send the read TS packets to the demultiplexing unit.

According to the aspects of the invention, it is possible to provide a digital contents reproducing and storing apparatus that is designed to reduce a process time without useless trial and error and to reduce a process load by directly searching the TS packets corresponding to the desired reproduction time information.

DETAILED DESCRIPTION OF EMBODIMENTS

Hereinafter, an exemplary embodiment of the invention will be described with reference to the accompanying drawings.

Figure 1:
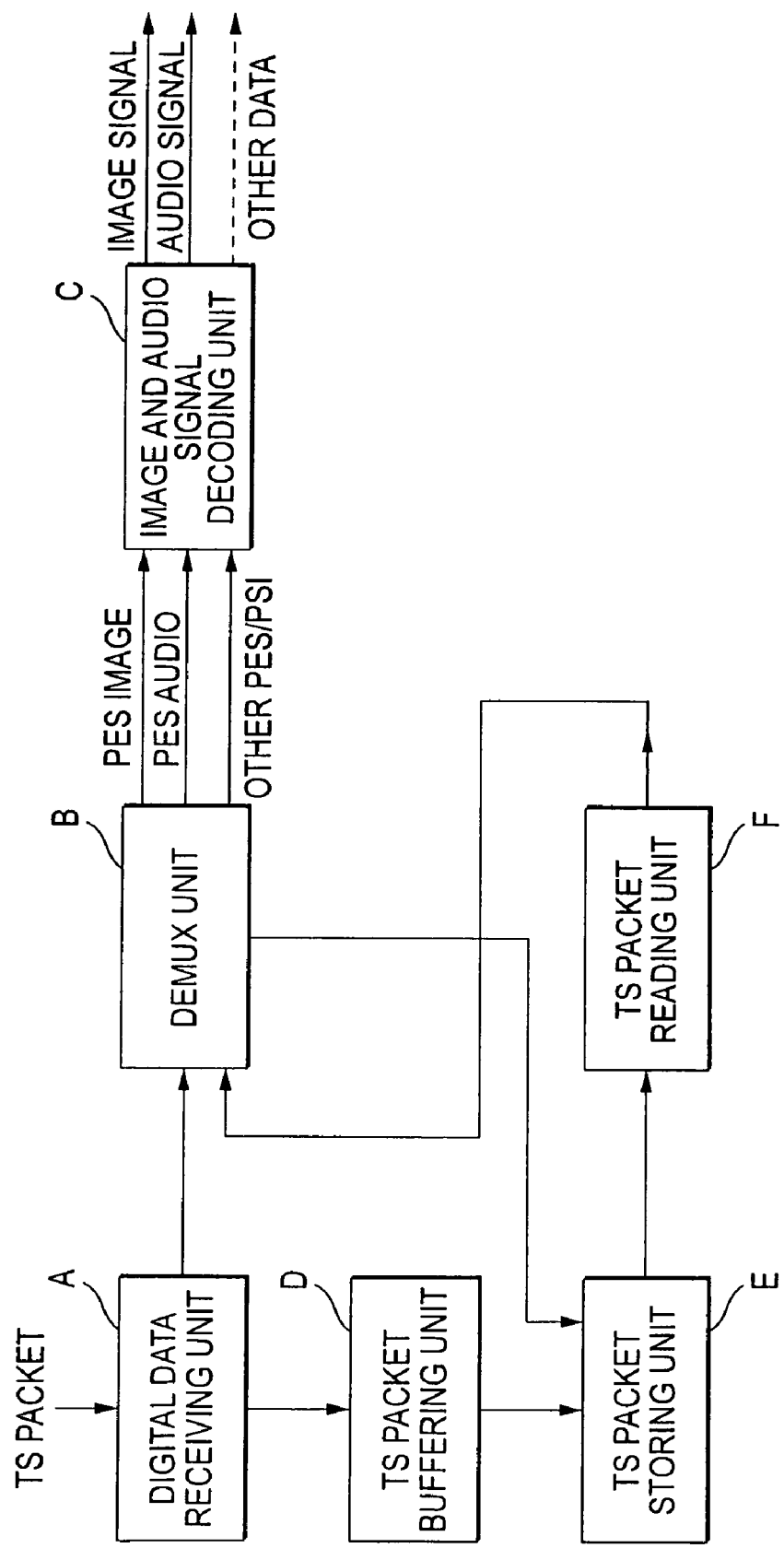
FIG. 1 is a schematic block diagram illustrating a digital content reproducing and storing apparatus according to an embodiment of the invention.

FIG. 1 is a schematic block diagram illustrating a digital content reproducing and storing apparatus according to an embodiment of the invention.

In the same drawing, a digital data receiving unit A receives TS packets which constitute digital content and which input in the form of TS stream. The received TS packets are input to a demultiplexing (hereinafter referred to as "demux") unit B, and the demux unit B demultiplexes the TS packets to extract at least an image PES and an audio PES. Other PES, for example, a data broadcast PES is also included therein, but the PES may be processed or not. When the image PES and the audio PES are extracted, an image and audio signal decoding unit C performs decoding operations on the basis of the image PES and the audio PES, respectively, and outputs an image signal and an audio signal which are synchronized with each other. At this time, a PS is generated on the basis of the PES, and the image signal and the audio signal are decoded on the basis of the PS, which can be carried out by various known techniques.

Meanwhile, the TS packets received by the digital data receiving unit A are input to a TS packet buffering unit D, and the TS packet buffering unit D sequentially buffers the received TS packets. TS packet storing unit E extracts time information on the basis of the PES obtained by the demux unit B, and stores the extracted time information together with content of the buffered TS packets. Since the time information can be extracted from the PES and the TS packets as a source of the PES are buffered by the TS packet buffering unit D, the TS packet storing unit E can store the TS packets and the time information in the state where the TS packets are linked with the time information.

The time information based on the PES can be obtained at any time from the time point when the PES is generated from the TS packets, and the time information obtained by the TS packet storing unit E may be obtained at any time after the PES is generated.

Additionally, when the prior time information desired to be reproduced is obtained through a user's operation, a TS packet reading unit F reads the TS packets linked with the time information corresponding to the designated prior time among the TS packets stored in the TS packet storing unit E, and sends the read TS packets to the demux unit B. The demux unit B demultiplexes the TS packets stored in the TS packet storing unit E in the same manner as the received TS packets. At this time, the image and audio signal decoding unit C performs decoding operations on the basis of the obtained image PES and the audio PES to obtain an image signal and an audio signal, respectively, and outputs the image signal and the audio signal which are synchronized with each other.

In this way, when the prior desired reproduction time information is obtained through a user's operation, it is possible to directly read the TS packets corresponding to the prior desired reproduction time information, and thus it is possible to effectively perform a process compared with a case in which the prior desired reproduction time information is obtained the PES generated from the TS packets which are read by guess.

Incidentally, the digital data receiving unit A, the demux unit B, the TS packet buffering unit D, and the TS packet storing unit E serve as an example of a storing unit configured to demultiplex the received TS packets to obtain the PES and add time information included in the PES to the received TS packets to sequentially store the received TS packets.

Further, the TS packet reading unit F, the demux unit B, the TS packet storing unit E, and the image and audio signal decoding unit C serve as a reproducing unit configured to specify the TS packets with the time information added thereto corresponding to the designated prior time to perform a reproducing operation on the desired prior time based on the specified TS packets A method with such a configuration corresponds to a digital content reproducing and storing method, and there may be prepared a computer readable medium storing a digital content reproducing and storing program for enabling a computer to realize such a method. Additionally, when the reproducing function is separated from the digital content reproducing and storing apparatus, it is possible to realize a digital content storing apparatus.

Figure 2:
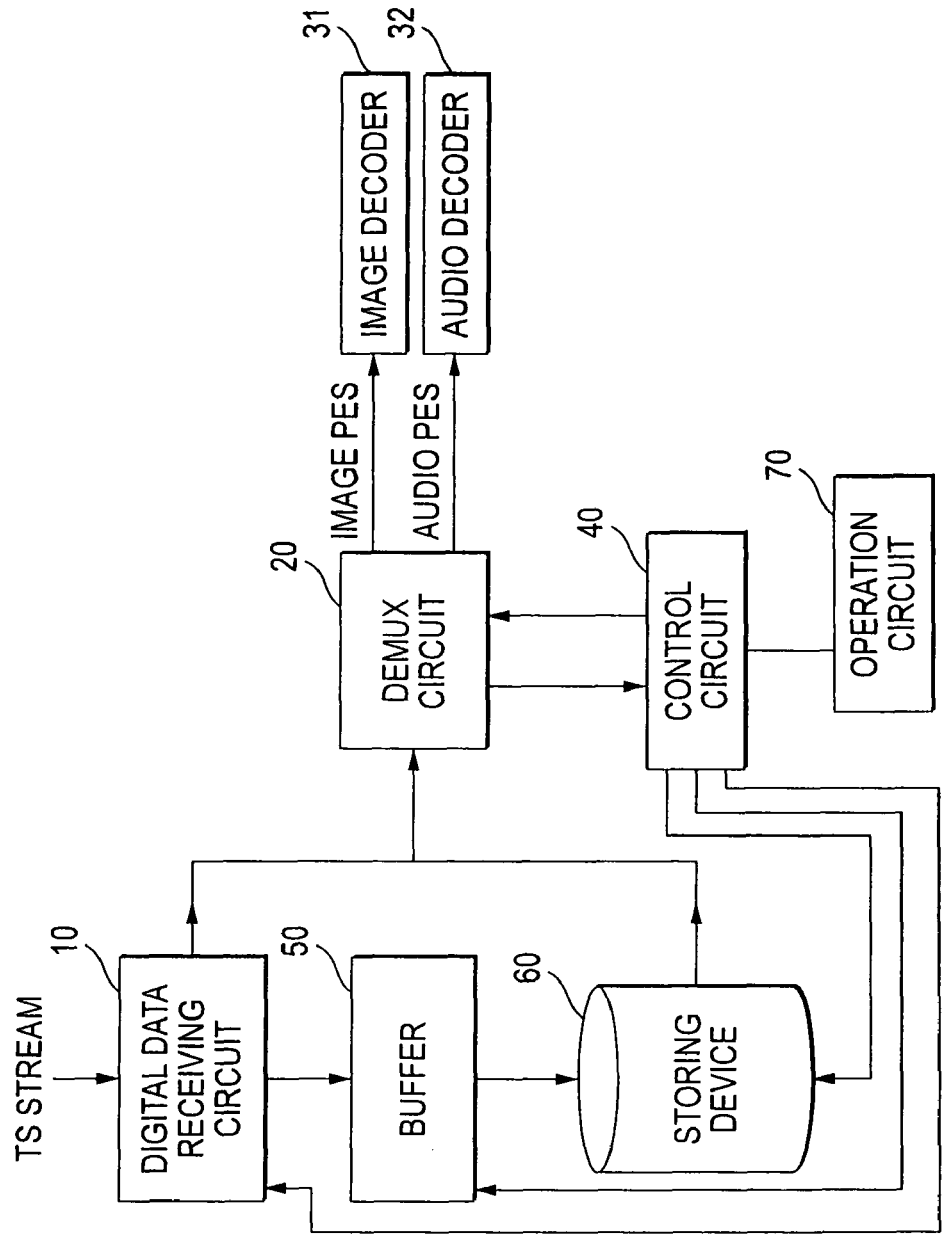
FIG. 2 is a block diagram illustrating the digital content reproducing and storing apparatus according to the embodiment of the invention.

FIG. 2 is a block diagram more specifically illustrating the configuration of the digital content reproducing and storing apparatus.

A digital data receiving circuit 10 receives a TS stream including the TS packets and extracts the TS packets therefrom. The digital data receiving circuit 10 may configured as a tuner part of the digital broadcast or an Ethernet circuit connected to a network. The digital content such as a video, an audio, and a still image are transmitted in the form of the TS stream. At this time, such digital content may be received using various forms. In this digital content reproducing and storing apparatus, the digital data receiving circuit may be configured as a digital tuner, a personal computer, or a cellular phone.

Figure 3:
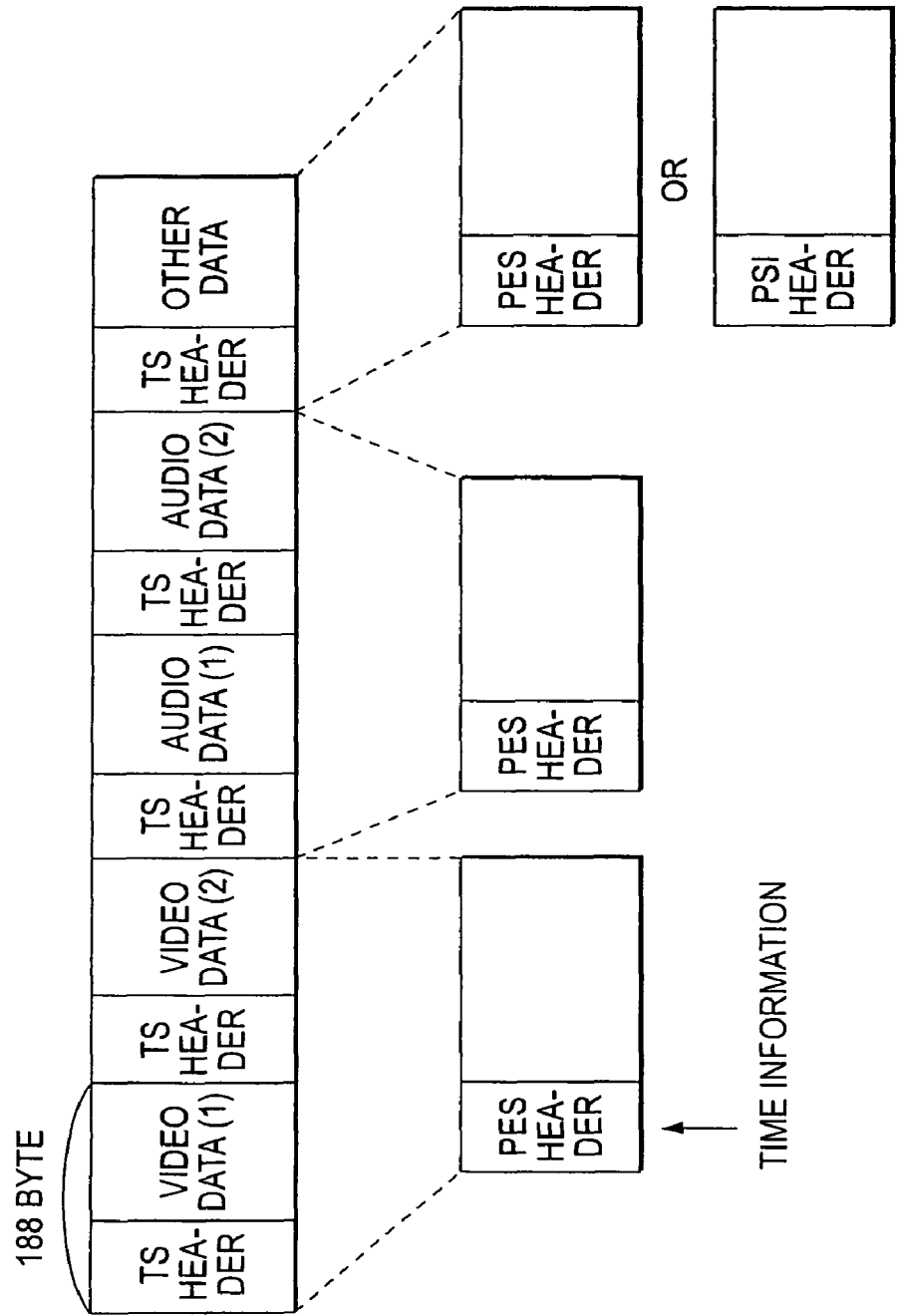
FIG. 3 is a diagram illustrating a correspondence between a PES and a TS packet of a TS stream.

The received TS packet is output to a DEMUX (DeMultiplex) circuit 20. As shown in FIG. 3, the TS stream is a series of the 188-byte TS packet. Each of the TS packets includes a TS header and data. The TS header includes various types of information. Moreover, the TS header includes data information included in payload and various types of information for creating a PES or a PSI (Program Specific Information). Accordingly, as shown in the figure, the DEMUX circuit 20 analyzes the TS header included in the TS packet to create the PES or the PSI by every type using the TS packet.

As simply shown in FIG. 3, the two first TS packets store two video data which are included in one image PES. In addition, the two subsequent TS packets store two audio data which are included in one audio PES. The one final TS packet stores one data which is included in other PES or PSI. The image PES and the audio PES each contain the two TS packets. In the TS header, data indicating the correspondent relation is recorded. The foremost packet is just simplified and the number of the TS packets included in one PES is exceptionally different.

Normally, video digital content complied with a MPEG standard include the image PES and the audio PES. In addition, in the data broadcast, the PES or the PSI of data is also included. In this embodiment, image and audio of the video are reproduced. At this time, the PES packets as the image PES are input to an image decoder 31 to be converted into an image signal, and the PES packets as the audio PES are input to an audio decoder 32. Additionally, the image PES and the audio PES include synchronization information therebetween, and a reproducing operation is carried out in the manner that the image decoder 31 and the audio decoder 32 are synchronized with each other on the basis of the synchronization information. A known technique may be used as a synchronization technique. Alternatively, the image decoder 31 and the audio decoder 32 may be independently synchronized with each other, or may be synchronized with each other on the basis of a control of an external controller.

The demux circuit 20 is connected to a control circuit 40 configured to perform various controls. In this embodiment, the demux circuit 20 outputs the PES header or time information obtained on the basis of the PES header to the control circuit 40. At this time, the demux circuit 20 notifies the control circuit 40 of information on the TS packets corresponding to the PES header. Additionally, the control circuit 40 notifies the demux circuit 20 of the TS packets as a process target. That is, the demux circuit 20 can perform the above-described process on the basis of any one of the TS packets output from the digital data receiving circuit 10 and the TS packets read and output from a storing device 60 described below. The control circuit 40 notifies the demux circuit 20 of the process target among them. The control circuit 40 includes a CPU, a ROM, a RAM, etc. therein, and executes a program illustrated in the flowchart described below.

The digital data receiving circuit 10 outputs the received TS packets to a buffer 50. The buffer 50 is a temporary storage region including a RAM, etc. The TS packets temporarily stored in the buffer 50 are stored in the storing device 60 on the basis of the control of the control circuit 40. The TS packets with an error may be deleted from the buffer 50 to store only the TS packets without an error in the storing device 60.

The buffer 50 may be configured as an independent temporary storage region or may be configured to commonly use a RAM region used upon receiving the TS stream. Additionally, the buffer 50 may be configured to use a part of a RAM in a circuit which includes a CPU or a RAM so as to more specifically configure the storing device 60. Further, the buffer 50 may be configured as a RAM region which is additionally mounted to a hard disk so as to specifically configure the storing device 60. The control circuit 40 performs a control operation to store the TS packets stored in the buffer 50 in the storing device 60 on the basis of time information based on the PES obtained by the demux circuit 20 and information on the TS packets corresponding to the PES. At this time, the TS packets are stored in the state where the header showing the time information obtained on the basis of the PES is attached thereto.

Figure 4:
FIG. 4 is a diagram illustrating a data and a TS header of the TS packet.
Figure 5:
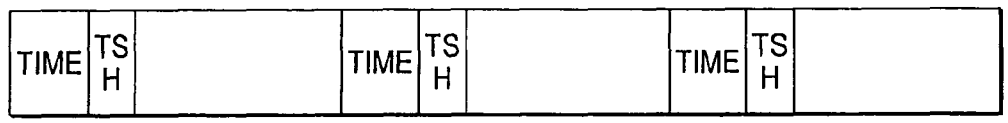
FIG. 5 is a diagram illustrating a state where time information is added to the TS packet.

FIGS. 4 to 7 illustrate a state where the time information is attached to the TS packets. FIG. 4 illustrates a state where the TS packets are transmitted in the form of a stream shape with the TS header attached to foremost positions of the TS packets. FIG. 5 illustrates a basic example where the TS packets are stored in the storing device 60 with the time information attached thereto. In this example, the time information is added to positions before the TS headers of the TS packets. In this example, the time information is added to the position before the TS header, but is not necessarily attached to the foremost position. Additionally, the time information is regarded as a single data with the TS packet. Even the case in which a management database is generated, and the stored TS packets and the time information are individually stored so as to match with each other in an one-to-one correspondence corresponds to the case in which the TS packets are stored with added time information according to the invention.

Figure 6:
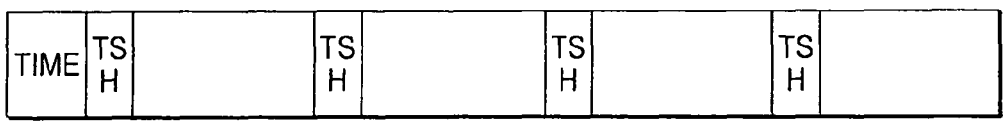
FIG. 6 is a diagram illustrating another state where time information is added to the TS packet.

FIG. 6 illustrates a state where a plurality of TS packets with one time information are stored in the storing device 60. In this way, when one time information is added to the plurality of TS packets, it is possible to add the same time information to a plurality of TS packets for generating one PES. Accordingly, since the TS packets are stored for each PES packet, it is possible to simply perform a process for generating the PES by the demux circuit 20. Further, since a plurality of TS packets are grouped and stored with one time information, it is possible to reduce a process compared with adding individual time information to each of the TS packets.

A storage collection unit is not limited to each PES packet, but may be set in consideration of storage efficiency of the storing device 60. For example, when the storage collection unit is set to a maximum data length stored in one sector of the storing device 60, it is possible to prevent storage capacity of the storing device 60 from being wasted. Specifically, when one sector length is 1,024 bytes, the maximum number of the TS packets stored in 1,024 bytes of sector length may be set to one storage unit.

Additionally, in this embodiment, it is possible to realize a function of reproducing an image before about ten seconds using the data stored in the storing device 60. Accordingly, when a settable minimum unit time is determined at this time, it is possible to group and store the TS packets by the unit time. When such an operation is carried out by one second unit, the TS packets may be stored by one second unit. Since the TS packets are accurately collected for the predetermined unit time, the TS packets are not stored too closely or approximately. Thus, it is possible to easily search the TS packets of the desired reproduction time.

An operation circuit 70 monitors a switch which detects a user's operation so as to output the monitored result to the control circuit 40. The operation circuit 70 includes a switch circuit which is mechanically connected to a user. At this time, the switch circuit may be configured to be operated by a mechanical operation or a wireless controlling operation.

In the above-described configuration, the digital data receiving unit A corresponds to the digital data receiving circuit 10 and the control circuit 40 for controlling the digital data receiving circuit 10. The demux unit B corresponds to the demux circuit 20 and the control circuit 40 controlling the demux circuit 20. The image and audio signal decoding unit C corresponds to the image decoder 31 and the audio decoder 32. The TS packet buttering unit D corresponds to the buffer 50 and the control circuit 40 of controlling the buffer 50. The TS packet storing unit E corresponds to the storing device 60 and the control circuit 40 controlling the storing device 60. Additionally, the TS packet reading unit F corresponds to the operation circuit 70 and the control circuit 40 controlling the operation circuit 70.

Figure 7:
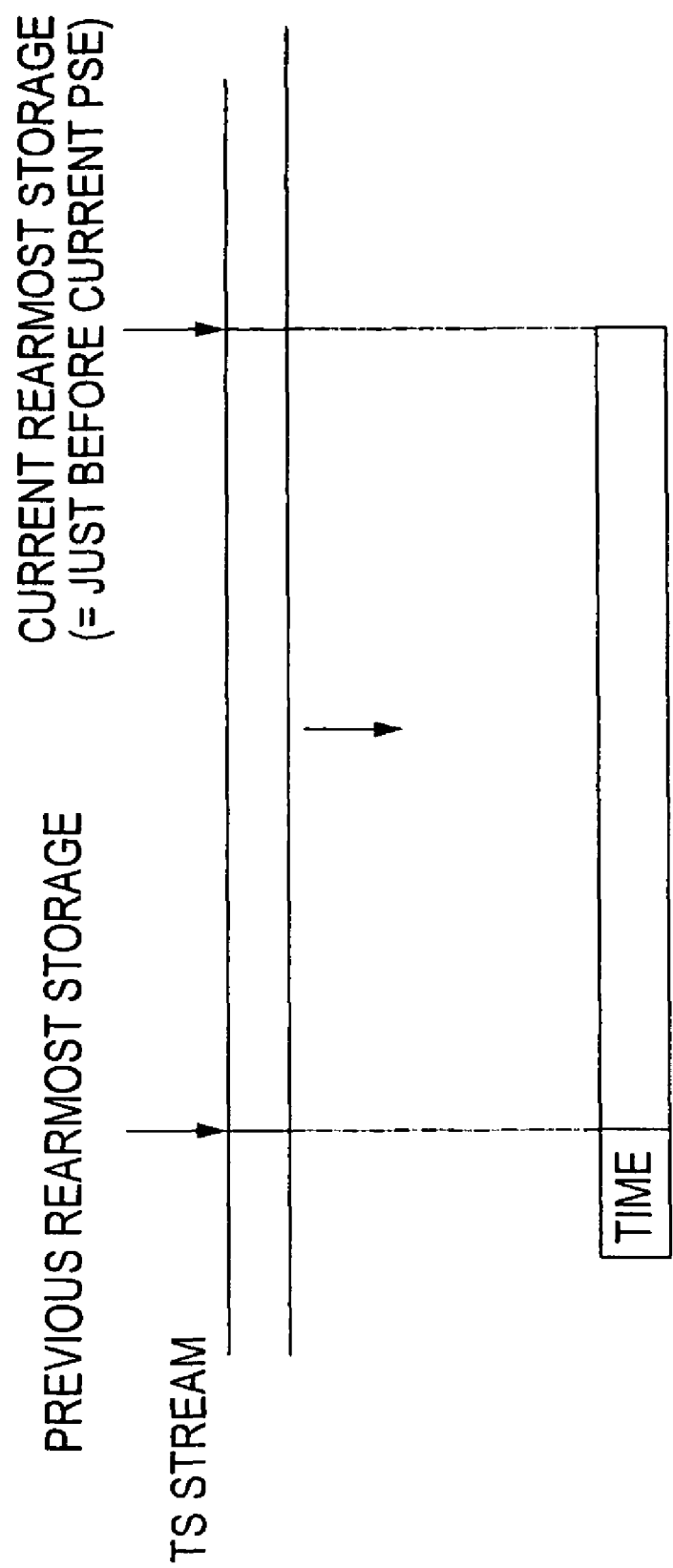
FIG. 7 is a diagram illustrating a pointer of a buffer.
Figure 8:
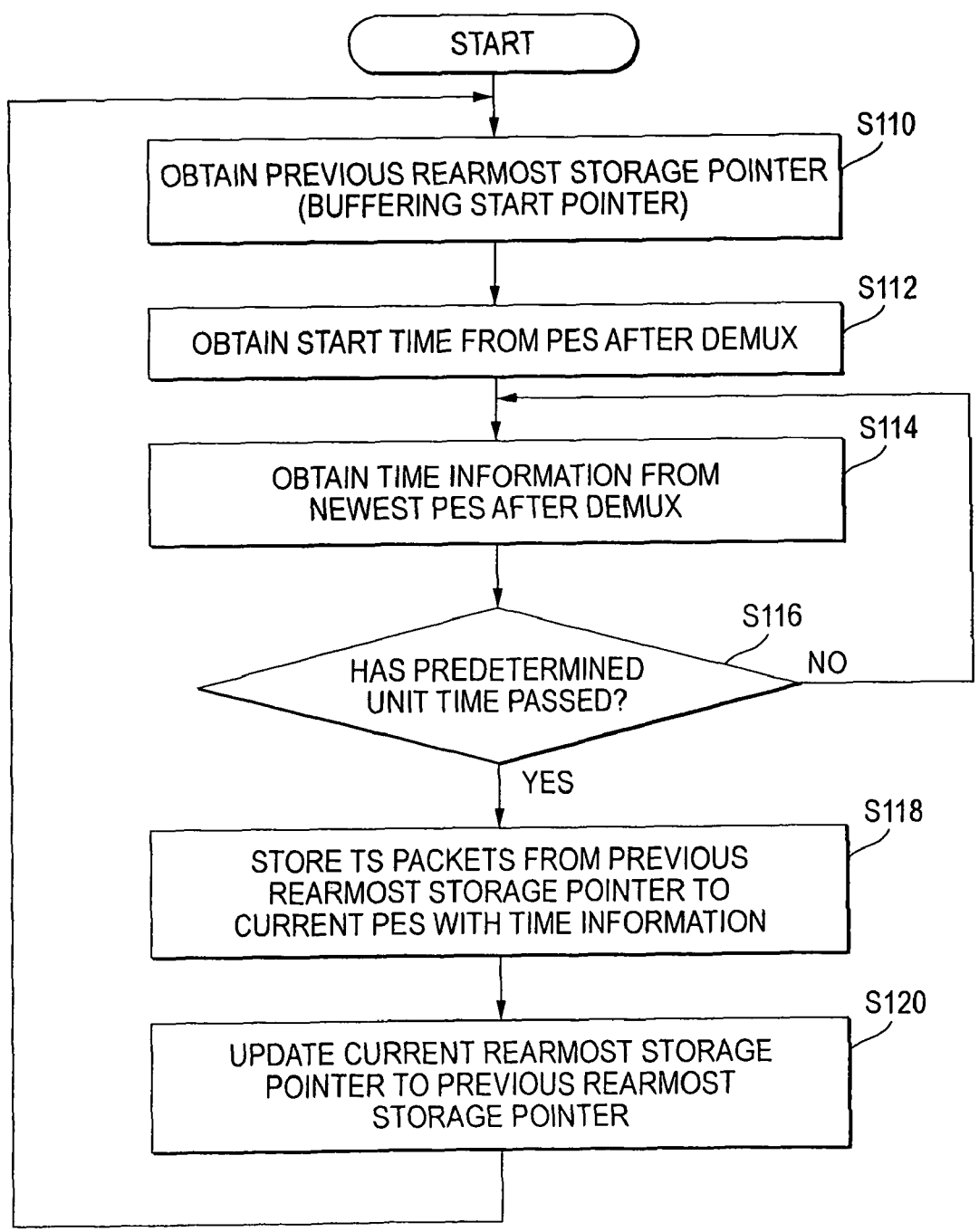
FIG. 8 is a flowchart illustrating a program in a storing state.

Next, FIGS. 7 and 8 illustrate a controlling operation for controlling the buffer 50 and the storing device 60 to store the TS packets in the storing device 60 on the basis of the time information on the PES, which is obtained from the demux circuit 20 by the control circuit 40, and the correspondence information between the PES and the TS packets.

In Step S110, the control circuit 40 first obtains a previous rearmost storage pointer of the buffer 50. The buffer 50 can store a predetermined amount of data in a FIFO manner. For efficiency of the process, the temporarily stored data is not deleted, and the data is sequentially overwritten while managing the pointer. In the buffer 50, a rearmost pointer position at the time point when the TS packets are stored in the storing device 60 corresponds to a start pointer position of the data to be subsequently stored. Accordingly, the rearmost storage pointer obtained in the previous time may be regarded as a buffering start pointer.

In Step S112, the control circuit 40 obtains the time information from the PES obtained through a demultiplexing operation of the demux circuit 20. The time information corresponds to the TS packets which are already stored in the storing device 60. In other words, the TS packets after current time are temporarily stored in the buffer 50, and thus the TS packets are not stored in the storing device 60.

In Step S114, the control circuit 40 obtains the time information from the newest PES obtained through a demultiplexing operation of the demux circuit 20. A difference between the current time information and the time information obtained in Step S112 substantially corresponds to a time when the TS packets are temporarily stored in the buffer 50. That is, the TS packets for the time difference correspond to the TS packets up to the TS packets generating the newest PES, among the TS packets stored in the buffer 50.

In Step S116, it is determined whether the time difference exceeds a predetermined unit time, and in Step S114, a process of obtaining the time information based on the subsequent newest PES is looped during a time when the time difference does not exceed the predetermined unit time.

On the other hand, in Step S116, when it is determined that the time difference exceeds the predetermined unit time, the TS packets for the unit time are temporarily stored in the buffer 50. Accordingly, the current process advances to Step S118, and the TS packets from the previous rearmost storage pointer up to the current PES are stored with the time information added thereto.

FIG. 7 illustrates the TS packets and the pointers which are sequentially and temporarily stored in the buffer 50 in a FIFO manner, which corresponds to the storage target from 'the previous rearmost storage' up to 'just before the current PES' and is stored in the storing device 60 with the time information added to the foremost position thereof. Additionally, the position of 'just before the current PES' corresponds to 'the current rearmost storage' and corresponds to 'the previous rearmost storage' in the subsequent storage. In this step, in order to change the storage content of the pointer, 'the current rearmost storage' pointer is updated to 'the previous rearmost storage' pointer, and then the process in Step S110 is repeated.

In this example, the predetermined time unit is used as the storage unit. However, when the storage is carried out by a predetermined capacity unit, it is determined whether a capacity of the TS packets temporarily stored in the buffer 50 exceeds a predetermined capacity in the processes of Step S112 to Step S116, and the TS packets stored in the buffer 50 may be stored in the storing device 60 at the exceeding time point in Step S118.

Additionally, it does not matter whether a position where the time information is added is the foremost position or the rearmost position, and the position correspondence may be separately managed by preparing a data base for managing the position correspondence.

Figure 9:
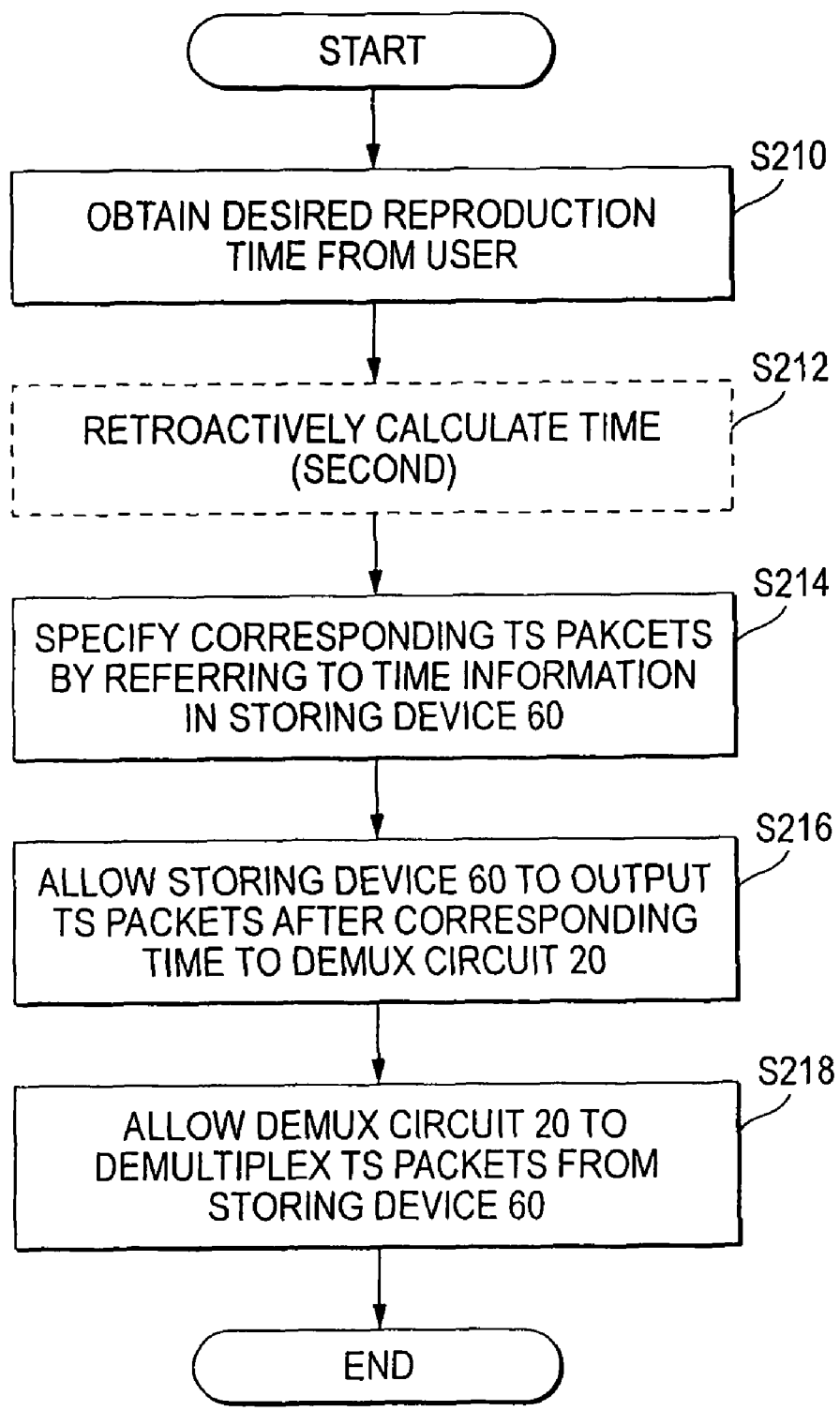
FIG. 9 is a flowchart illustrating a program in a reproducing state.

Next, a controlling operation in accordance with a user's reproducing instruction will be described, FIG. 9 is a flowchart illustrating the controlling operation.

In Step S210, the control circuit 40 obtains a desired reproduction time input from a user through the operation circuit 70. The desired reproduction time may be obtained in various ways. For example, the desired reproduction time may be obtained in the manner of 'hour/minute/second'. Alternatively, the desired reproduction time may be simply specified in the manner of 'several seconds ago'. Since the specifying operation is relative in many cases, the specifying operation is not particularly limited.

Step S212 is depicted by a dashed line and is a process for calculating a time (second) desired to be retroactively reproduced. In accordance with the format of the time information stored in the storing device 60, it may be advantageous when the TS packets as a target are specified by counting the number of seconds to be retroacted. In such a case, in Step S212, the retroaction time is calculated.

In Step S214, the control circuit 40 specifies the corresponding TS packets by referring to the time information in the storing device 60. Additionally, in Step S216, the control circuit 40 instructs the storing device 60 to sequentially output the TS packets after the corresponding time to the demux circuit 20. Further, in Step S218, the control circuit 40 instructs the demux circuit 20 to demultiplex the TS packets as a process target from the storing device 60.

The specific instruction method is dependent on the specific configurations of the demux circuit 20 and the storing device 60. At this time, the case in which the control circuit 40 notifies the storing device 60 of the output target or notifies the demux circuit 20 of the input target is also included in the specific instruction method. The case in which the control circuit 40 normally specifies the TS packets as a process target to be demultiplexed by the demux circuit 20 and performs a transmission control corresponds to a process for reading the TS packets as a process target from the storing device 60 and outputting the TS packets to the demux circuit 20.

Additionally, while performing such a process, it is necessary to store the new TS packets input to the digital data receiving circuit 10 in the storing device 60 through the buffer 50. At this time, the demux circuit 20 generates the PES through two input channels and outputs the PES from one channel to the image decoder 31 or the audio decoder 32 in the subsequent stage.

In this way, the TS packets received by the digital data receiving unit A are input to the TS packet buffering unit D and then the TS packet buffering unit D buffers the sequentially input TS packets. Subsequently, the TS packet storing unit E extracts the time information on the basis of the PES obtained by the demux unit and stores the content of the buffered TS packets with the extracted time information, thereby storing the TS packets and the time information in a linked state.

Figure 10:
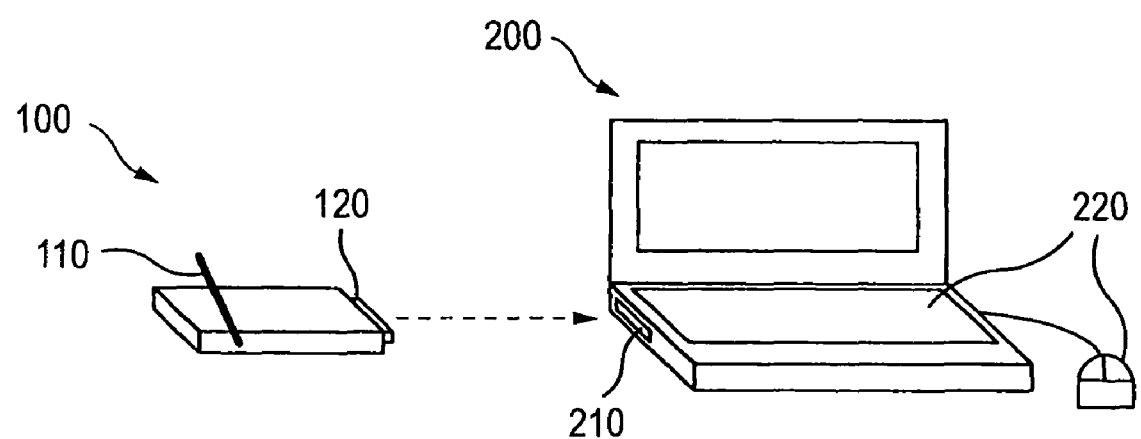
FIG. 10 is a schematic diagram illustrating a digital content reproducing and storing system according to an embodiment of the invention.

FIG. 10 is a schematic diagram illustrating a digital content reproducing and storing system according to an embodiment of the invention. As shown in FIG. 10, the digital content reproducing and storing system includes a digital content receiver 100 and a personal computer 200.

The digital content receiver 100 includes, an antenna 110 configured to receive a wireless signal containing digital content data; and a connector 120 such as a USE (Universal Serial Bus) connector. The personal computer 200 includes an external port 210 such as a USB port and an input device 220 such as a keyboard and/or a mouse. The connector 120 of the digital content receiver 100 is connectable to the external port 210 of the personal computer 210.

The digital content reproducing and storing system shown in FIG. 10 can implement the digital content reproducing and storing apparatus of the embodiment explained above. For example, the digital content receiver 100 has a function corresponding to the digital data receiving unit A (see FIG. 1), and the personal computer 200 has functions corresponding to other units B to F. In this case, an interface provided in the personal computer 200 for the external connection of the digital content receiver 100 may be regarded as a function corresponding to the digital data receiving unit A. Accordingly, both the digital content receiver 100 and the personal computer 200 may be configured to operate a function corresponding a single functional unit shown in FIG. 1.

The digital content receiver 100 may have a plurality of functions corresponding to two or more of units A to F shown in FIG. 1. In this case, the personal computer 200 has functions corresponding to the rest of the units A to F.

Further, the digital content receiver 100 may have all functions corresponding to all the units A to F shown in FIG. 1. In this case, the personal computer 200 receives the video signal, the audio signal and other data from the image and audio signal decoding unit C provided in the digital content receiver 100 via the connector 120 and the external port 210.

Incidentally, the technique for storing the TS packets with the time information is not necessarily limited to a substantial apparatus, but may be a method of exhibiting the same function. For this reason, there may be provided a digital content reproducing and storing method.

That is, the invention is not limited to a substantial apparatus, but may be a method thereof.

The digital content reproducing and storing apparatus may be independently embodied or may be embodied while being mounted in other device. That is, the spirit of the invention is not limited thereto, but may include various forms. Accordingly, the invention may be appropriately modified into the form of software or hardware.

In the case where the invention is embodied by software of the digital content reproducing and storing apparatus, a computer readable medium storing such software necessarily included in the implementation example of the spirit of the invention.

As an example thereof, there may provided the computer readable medium string the digital content reproducing and storing program.

The computer readable medium may be any type of media such as a magnetic storage medium, a magnetoptical medium, or other types of storage media to be developed in the future. The reproduction stages such as a first reproduction and a second reproduction are equivalent to each other without any doubt. In addition, the invention may be embodied using communication lines as supply means.

The invention is not departed from the spirit of the invention even in a case where a part of the invention is embodied by software and a part of the invention is embodied hardware. Moreover, the invention may be embodied in a case where a part of the program is stored in a recording medium to be used, if necessary.

In a case where the invention is embodied by software, it is possible to also use hardware or an operating system. In addition, the invention can be embodied separately from the hardware and the operating system. For example, various calculation processes can be performed by using a predetermined function of the operating system or by the hardware without using the function. In addition, even though the invention is embodied using the operating system, the invention can be embodied using only the program when the program recorded in a computer readable medium is distributed.

When the invention is embodied by software, the invention can be embodied by a computer readable medium for recording the program, and can be naturally embodied by the program as it is. Moreover, the program itself is included in the invention.

What is claimed is:

1. A digital content reproducing and storing apparatus configured to perform a storing operation while receiving TS packet constituting digital content and configured to perform a reproducing operation through a PES (Packetized Elementary Stream) obtained by demultiplexing the received TS packet or a read-out TS packet stored therein, the digital content reproducing and storing apparatus comprising:
   a demultiplexer to demultiplex the received TS packet to obtain the PES;
   a control circuit to sequentially buffer the received TS packet in a buffer, and stores a group of buffered TS packets for a predetermined time in storage while adding time information contained in the obtained PES to the group; and
   a reproducer which specifies a TS packet based on the time information corresponding to a designated prior time and perform the reproducing operation based on the specified TS packet, wherein when storing the group of the buffered TS packets while adding the time information to the group, the control circuit:

obtains a rearmost storage pointer in the buffer at storing a previous group of TS packets;

obtains first time information for a TS packet which has already been stored in the storage, from a PES obtained by the demultiplexer;

obtains second time information from a newest PES obtained by the demultiplexer;

determines whether a time difference between the first time information and the second time information exceeds the predetermined time; and stores a group of TS packets buffered from the rearmost storage pointer up to a TS packet corresponding to the newest PES while adding time information if it is determined that a time difference exceeds the predetermined time.

2. The digital content reproducing and storing apparatus according to claim 1, wherein the predetermined time corresponds to a minimum time unit which can be designated in the reproducer.

3. A digital content reproducing and storing method for performing a storing operation while receiving TS (Transport Stream) packets constituting digital content and performing a reproducing operation through a PES (Packetized Elementary Stream) obtained by demultiplexing the received TS packet or read-out TS packet having been stored therein, the digital content reproducing and storing method comprising:

demultiplexing the received TS packet with a demultiplexer to obtain the PES, sequentially buffering the received TS packet in a buffer using a control circuit, storing a group of buffered TS packets for a predetermined time in a storage while adding time information contained in the obtained PES to the group; and specifying a TS packet based on the time information corresponding to a designated prior time to perform the reproducing operation based on the specified TS packet;

wherein when storing the group of the buffered TS packets while adding the time information to the group, the control circuit performs the following steps:

obtaining a rearmost storage pointer in the buffer at storing a previous group of TS packets;

obtaining first time information for a TS packet which has already been stored in the storage, from a PES obtained by the demultiplexer;

obtaining second time information from a newest PES obtained by the demultiplexer;

determining whether a time difference between the first time information and the second time information exceeds the predetermined time; and storing a group of TS packets buffered from the rearmost storage pointer up to a TS packet corresponding to the newest PES while adding time information if it is determined that a time difference exceeds the predetermined time.

4. The digital content reproducing and storing apparatus according to claim 3, wherein the predetermined time corresponds to a minimum time unit which can be designated in the reproducer.

5. A non-transitory computer readable medium that stores a digital content reproducing and storing program for enabling a computer to execute a function of performing a storing operation while receiving TS (Transport Stream) packet constituting digital content and to execute a function of performing a reproducing operation through a PES (Packetized Elementary Stream) obtained by demultiplexing the received TS packet or the read-out TS packets having been stored therein, the program enables the computer to execute:

demultiplexing the received TS packet with a demultiplexer to obtain the PES, sequentially buffering the received TS packet in a buffer and storing a group of buffered TS packets for a predetermined time in a storage while adding time information contained in the obtained PES to the group;

specifying a TS packet based on the time information corresponding to a designated prior time and performing the reproducing operation based on the specified TS packet;

wherein when storing the group of the buffered TS packets while adding the time information to the group, the control circuit performs the following steps:

obtaining a rearmost storage pointer in the buffer at storing a previous group of TS packets;

obtaining first time information for a TS packet which has already been stored in the storage, from a PES obtained by the demultiplexer;

obtaining second time information from a newest PES obtained by the demultiplexer;

determining whether a time difference between the first time information and the second time information exceeds the predetermined time; and storing a group of TS packets buffered from the rearmost storage pointer up to a TS packet corresponding to the newest PES while adding time information if it is determined that a time difference exceeds the predetermined time.

6. The non-transitory computer readable medium according to claim 5, wherein the predetermined time corresponds to a minimum time unit which can be designated in the reproducer.

7. A digital content storing apparatus storing a received TS (Transport Stream) packet constituting digital content, the digital content storing apparatus comprising:

a demultiplexer to demultiplex the received TS packet to obtain a PES, a control circuit to sequentially buffer the received TS packet in a buffer and store a group of buffered TS packets for a predetermined time in a storage while adding time information contained in a PES to the group;

wherein when storing the group of the buffered TS packets while adding the time information to the group, the control circuit:

obtains a rearmost storage pointer in the buffer at storing a previous group of TS packets;

obtains first time information for a TS packet which has already been stored in the storage, from a PES obtained by the demultiplexer;

obtains second time information from a newest PES obtained by the demultiplexer;

determines whether a time difference between the first time information and the second time information exceeds the predetermined time; and stores a group of TS packets buffered from the rearmost storage pointer up to a TS packet corresponding to the newest PES while adding time information if it is determined that a time difference exceeds the predetermined time.

* * * * *